(12) United States Patent  
Rothschild

(10) Patent No.: US 7,995,118 B2  
(45) Date of Patent: *Aug. 9, 2011

(54) DEVICE AND METHOD FOR EMBEDDING AND RETRIEVING INFORMATION IN DIGITAL IMAGES

(75) Inventor: Leigh M. Rothschild, Sunny Isles Beach, FL (US)

(73) Assignee: Rothschild Trust Holdings, LLC, Sunny Isles Beach, FL (US)

( * ) Notice: Subject to any disclaimer, the term of this patent is extended or adjusted under 35 U.S.C. 154(b) by 60 days.

This patent is subject to a terminal disclaimer.

(21) Appl. No.: 12/290,066

(22) Filed: Oct. 27, 2008

(65) Prior Publication Data

US 2009/0059014 A1   Mar. 5, 2009

Related U.S. Application Data

(63) Continuation of application No. 10/998,691, filed on Nov. 29, 2004, now Pat. No. 7,450,163.

(51) Int. Cl.  
*H04N 5/76* (2006.01)

(52) U.S. Cl. ............. 348/231.3; 348/231.4; 348/231.5; 348/231.6

(58) Field of Classification Search ..... 348/231.2–231.6  
See application file for complete search history.

(56) References Cited

U.S. PATENT DOCUMENTS

| | | | |
|---|---|---|---|
| 5,737,491 A * | 4/1998 | Allen et al. | 704/270 |
| 6,282,362 B1 | 8/2001 | Murphy et al. | |
| 6,295,391 B1 | 9/2001 | Rudd et al. | |
| 6,373,551 B2 | 4/2002 | Manico et al. | |
| 6,642,959 B1 | 11/2003 | Arai | |
| 6,657,661 B1 | 12/2003 | Cazier | |
| 6,674,923 B1 | 1/2004 | Shih et al. | |
| 6,714,736 B2 | 3/2004 | Manico et al. | |
| 6,883,146 B2 | 4/2005 | Prabhu et al. | |
| 6,947,571 B1 | 9/2005 | Rhoads et al. | |
| 7,006,146 B1 * | 2/2006 | Tanaka et al. | 348/376 |
| 7,110,964 B2 | 9/2006 | Tengler et al. | |
| 7,123,782 B2 | 10/2006 | Shih et al. | |
| 7,154,536 B2 | 12/2006 | Kuwayama | |
| 7,154,621 B2 | 12/2006 | Rodriguez et al. | |
| 7,180,622 B2 | 2/2007 | Cooper | |
| 7,321,783 B2 * | 1/2008 | Kim | 455/556.1 |
| 7,379,978 B2 | 5/2008 | Anderson et al. | |
| 7,415,662 B2 | 8/2008 | Rothmuller et al. | |
| 2002/0063901 A1 | 5/2002 | Hicks | |
| 2003/0063194 A1 | 4/2003 | Nishiyama et al. | |
| 2004/0141084 A1 | 7/2004 | Kurakata | |
| 2004/0189807 A1 | 9/2004 | Smith | |
| 2005/0036042 A1 | 2/2005 | Haas et al. | |
| 2005/0144189 A1 | 6/2005 | Edwards et al. | |
| 2005/0258246 A1 | 11/2005 | Wolff et al. | |
| 2006/0114337 A1 | 6/2006 | Rothschild | |
| 2006/0114338 A1 | 6/2006 | Rothschild | |
| 2006/0114514 A1 | 6/2006 | Rothschild | |
| 2006/0114516 A1 | 6/2006 | Rothschild | |
| 2006/0176516 A1 | 8/2006 | Rothschild | |

* cited by examiner

Primary Examiner — David L Ometz  
Assistant Examiner — Dillon Durnford-Geszvain  
(74) Attorney, Agent, or Firm — Hespos & Porco

(57) ABSTRACT

A digital imaging device and methods thereof that will enable the embedding and retrieving of information in digital images are provided. The digital imaging device includes a capture module for capturing an image and creating a digital image file; an input module for inputting information regarding the captured image; and a processing module for associating the inputted information to the digital image file. The device further includes a scanning module for reading a symbology associated with a printed digital image and wherein the processing module is adapted to use the symbology to retrieve the associated information of the digital image file. The device may be embodied as a digital camera, a mobile phone, personal digital assistant (PDA), etc.

21 Claims, 4 Drawing Sheets

DEVICE AND METHOD FOR EMBEDDING AND RETRIEVING INFORMATION IN DIGITAL IMAGES

This application is a continuation application of U.S. application Ser. No. 10/998,691, filed Nov. 29, 2004, entitled "DEVICE AND METHOD FOR EMBEDDING AND RETRIEVING INFORMATION IN DIGITAL IMAGES", the contents of which are incorporated by reference in their entirety.

BACKGROUND

1. Field

The present disclosure relates generally to digital image processing, and more particularly, to devices and methods for embedding and retrieving information in digital images and using the information to organize, process and control the digital images.

2. Description of the Related Art

Photographs are taken for a variety of personal and business reasons. During the course of the year, an individual may take numerous photographs of various events. During these events, quite often there is a variety of different individuals and items present in these photographs. In the prior art, when one desires to catalog these images in a particular order, they usually are left to placing these images manually into photograph albums. This is a very extensive, manual procedure requiring a significant amount of time. In addition, it is very limited with regard to the amount of information that can be associated with the image in a quick and easy manner. While some photo albums allow the writing and placing of text, the entering of this data is a very time consuming and arduous affair. Once having sorted these images into particular albums which may represent categories of interest, it is extremely difficult to retrieve and/or reorganize the images into other categories.

With the advent of digital cameras and digital imaging, the process of organizing images and associating information with the images has become even more difficult. Firstly, upon capturing an image with a digital camera, the camera simply gives the image a numerical file name which usually has no meaning to the user and makes it difficult to retrieve at a later date. Secondly, with the technological advances in file size compression and increased capacity of storage media, several hundred images may be taken before a user downloads the images to a computer or other device, making it a very time consuming task to associate information to each image.

Therefore, a need exists for techniques for easily associating information about an image to the image and using the information to control and retrieve the image.

SUMMARY

A device for capturing, storing, allowing user input, receiving internal input, processing, transmitting, scanning, and displaying digital images is provided. Digital photography has gained a substantial share of the worldwide photographic market. More and more cameras record images in digital form and more and more of these images are stored digitally for retrieval or archival purposes on home and business computers and on the Global Computer Network, e.g., the Internet. The present disclosure describes hardware devices and methods that will facilitate embedding information into digital images of any type (e.g., jpeg, bmp, tiff, etc.) to organize, control and manipulate these images both while in digital form, and later when in printed form.

According to one aspect of the present disclosure, a digital imaging device is provided including a capture module for capturing an image and creating a digital image file; an input module for inputting information regarding the captured image; and a processing module for associating the inputted information to the digital image file. The processing module is adapted to create a separate information file including the inputted information that is linked to the digital image file or to append the inputted information to the digital image file. The device further includes a display module for displaying the captured imaged, wherein the display module is adapted to prompt a user to input information regarding the captured image. Furthermore, the display module may include an audio output device for audibly prompting a user to input information regarding the captured image.

In another aspect of the present disclosure, the device includes a character recognition capture device coupled to the input module for entering information regarding the capture images, wherein the character recognition device is a touch screen overlaid upon the display module.

In a further aspect, the device includes a transmission module for transmitting at least one digital image file and its associated information to a computing device, wherein the transmission module is a hardwired connection, a wireless connection or a removable memory card slot for receiving removable memory.

In another aspect of the present disclosure, the device includes a scanning module for scanning information to be associated with the digital image file. The scanning module will also be employed for reading a symbology associated with a printed digital image and wherein the processing module is adapted to use the symbology to retrieve the associated information of the digital image file.

In still a further aspect of the present disclosure, a mobile communication device is provided including a communication module coupled to an antenna for wirelessly receiving and transmitting communication messages; a capture module for capturing an image and creating a digital image file; an input module for inputting information regarding the captured image; and a processing module for associating the inputted information to the digital image file.

In another aspect of the present disclosure, a method for associating information with a digital image is provided. The method includes the steps of capturing an image and creating a digital image file; prompting a user for information regarding the captured image; receiving information from the user; and associating the received information to the digital image file. The prompting step includes displaying at least one question to the user or audibly producing at least one question to the user. The receiving step further includes the steps of receiving text input via a character recognition capture device; and translating the text input into alphanumeric characters, or alternatively, includes the steps of receiving spoken input via a microphone; and translating the spoken input into alphanumeric characters.

In one aspect, the associating step includes creating a separate information file including the received information that is linked to the digital image file. In another aspect, the associating step includes appending the received information to the digital image file.

The method further includes the step of transmitting the digital image file and associated information to a computing device and retrieving the associated information by scanning a symbology printed with the captured digital image.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1A:
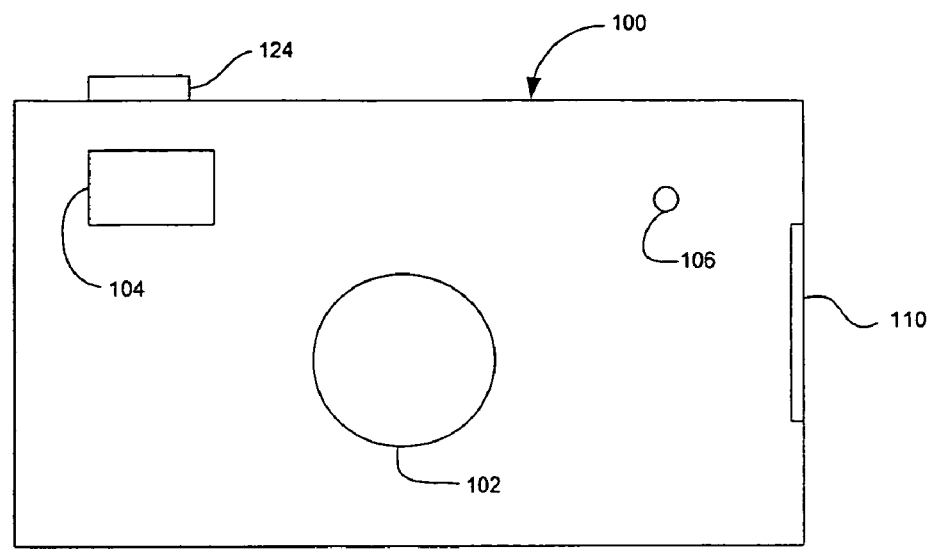
FIG. 1A is front view of a device for capturing digital images and embedding information in the captured images according to an embodiment of the present disclosure.

Preferred embodiments of the present disclosure will be described hereinbelow with reference to the accompanying drawings. In the following description, well-known functions or constructions are not described in detail to avoid obscuring the present disclosure in unnecessary detail. Throughout the figures like reference numerals represent like elements.

Figure 1B:
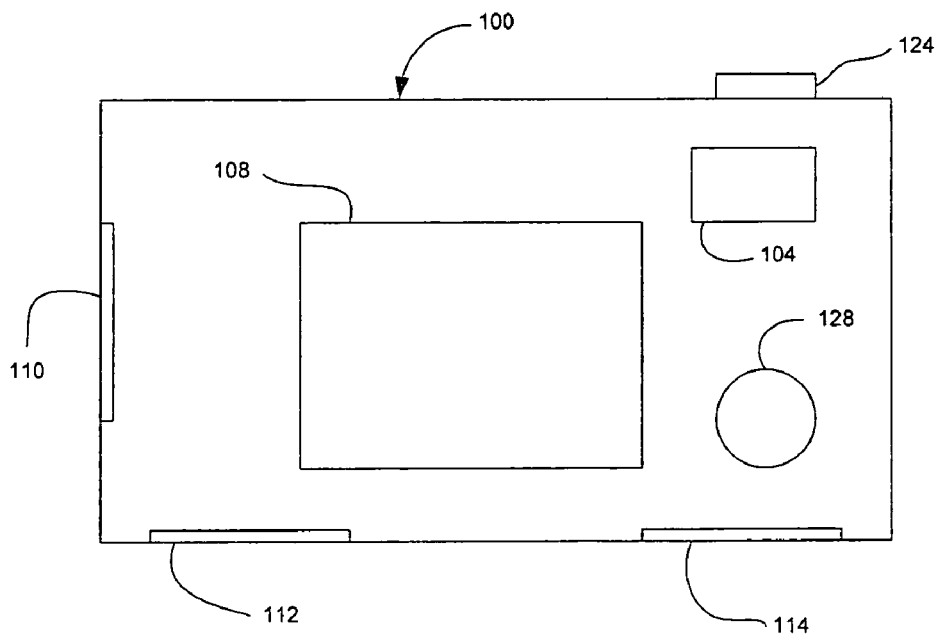
FIG. 1B is a rear view of the device illustrated in FIG. 1A.

A hardware device and methods thereof that will enable the embedding and retrieving of information in digital images are provided. The embedded information will enable a user to organize, process and control these images. Referring to FIGS. 1A and 1B, a device 100 for capturing images and associating information about the captured images is shown. The device 100 includes a lens 102 coupled to a capture module, which will be described in detail below, for capturing an image and a viewfinder 104 for correctly positioning the device when capturing an image. The device 100 further includes a microphone 106 for acquiring audio, from the user of the device or from the subject of the image, which may be associated with the image.

A rear side of the device 100 is illustrated in FIG. 1B where a display module 108 is provided for displaying the captured image. As will be described in more detail below, the display module 108 may include a touch screen for facilitating user input of information to be associated with digital image. The device 100 further includes a storage module 110 for storing a plurality of images, a transmission module 112 for transmitting the plurality of images to another device, e.g., a personal computer, a personal digital assistant (PDA), a server residing on the Internet, etc, and a scanning module 114 for scanning and inputting information to be associated with an image and for reading information from printed images.

Figure 2:
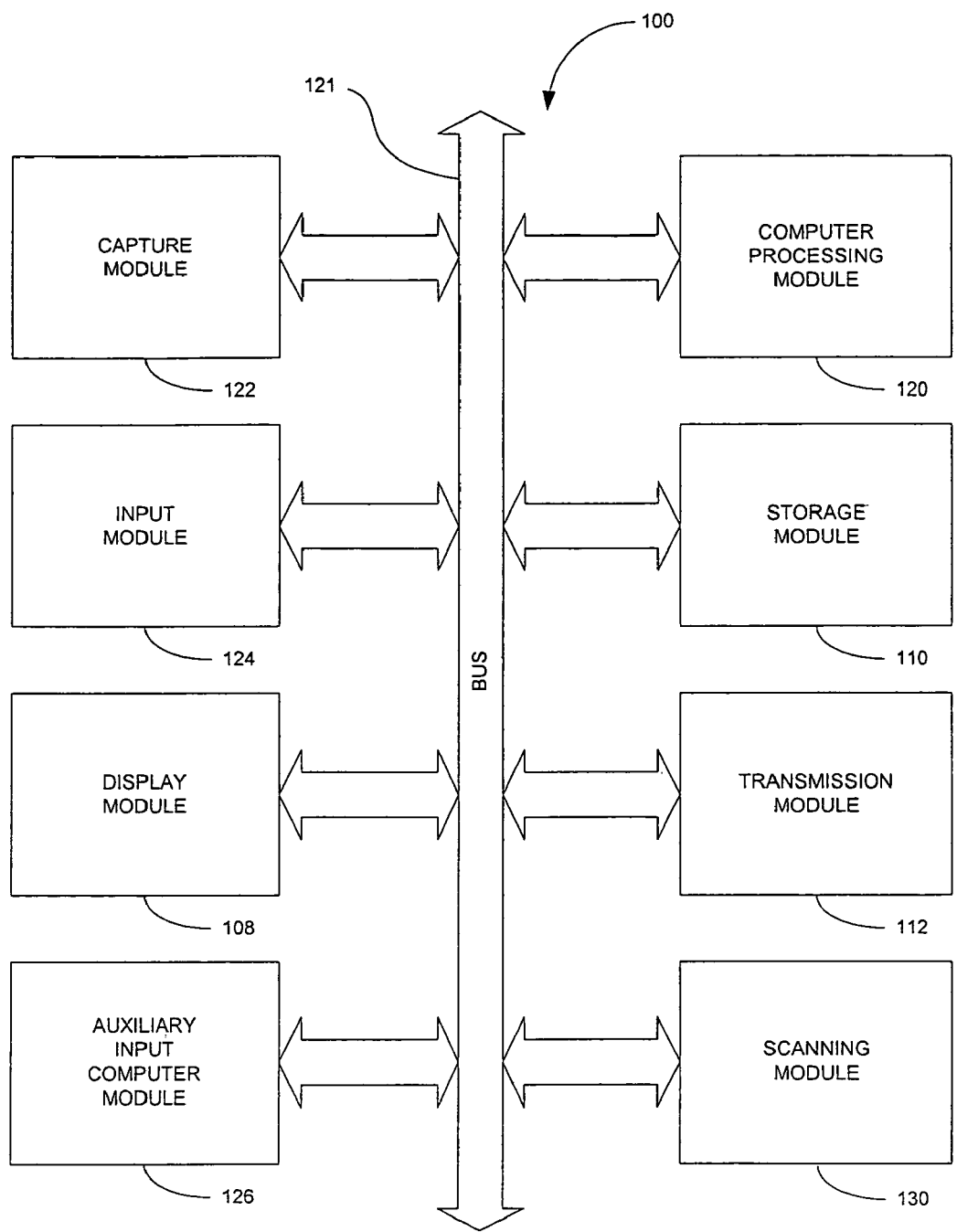
FIG. 2 is a block diagram of various modules included in a device for capturing images and embedding information in the images in accordance with the present disclosure.

Referring to FIG. 2, the various components of the device 100 will now be described. The device will contain a computer processing module 120, e.g., a microprocessor. The computer processing module 120 will use computer software instructions that have been programmed into the module and conventional computer processing power to interact and organize the traffic flow between the various other modules. It is to be understood that the present disclosure may be implemented in various forms of hardware, software, firmware, special purpose processors, or a combination thereof. A system bus 121 couples the various components shown in FIG. 2 and may be any of several types of bus structures including a memory bus or memory controller, a peripheral bus, and a local bus using any of a variety of bus architectures. The device also includes an operating system and micro instruction code preferably residing in read only memory (ROM). The various processes and functions described herein may either be part of the micro instruction code or part of an application program (or a combination thereof) which is executed via the operating system.

It is to be further understood that because some of the constituent device components and method steps depicted in the accompanying figures may be implemented in software, the actual connections between the device components (or the process steps) may differ depending upon the manner in which the present disclosure is programmed. Given the teachings of the present disclosure provided herein, one of ordinary skill in the related art will be able to contemplate these and similar implementations or configurations of the present disclosure.

Capture module 122 will capture an image desired by the user in digital form. The capture module includes an image sensor, an analog-to-digital (A/D) converter and a digital signal processor (DSP). As the user pushes the device's shutter button 124, light is allowed to enter through the lens 102 and shine on the image sensor, e.g., a charge-coupled device (CCD) or complimentary metal-oxide semiconductor (CMOS). The image sensor includes preferably millions of photosensors, e.g., pixels, wherein each pixel absorbs the light and transforms the light into an electric charge proportional to the intensity of light. Each charge is transmitted to an A/D converter where the charge is converted into a digital value representing the color the pixel will be, e.g., representing different intensities of red, green and blue. The digital values are then passed to the digital signal processor which enhances the image, compresses it and then stores it in a digital file format in the storage module 110. The storage module 110 includes internal storage memory, e.g., random access memory (RAM), or removable memory such as a CompactFlash card, Memory Stick, SmartMedia, MultiMediaCard (MMC), SD (Secure Digital) memory, or any other memory storage that exists currently or will exist in the future. The digital file format utilized to store the image is not critical, but may include standard file formats which currently exist or will exist in the future for example jpeg, tiff, bmp, gif, pcx, png or other file formats.

The device 100 will also contain a display module 108 for the user to view acquired images. This display may be in any current form in the art, including Liquid Crystal Displays (LCD), Light emitting diode displays (LED), Cathode Ray Tube Displays (CRT) or any other type of display currently existing or existing in the future. The display module 108 will also include an audio output device 128, e.g., a speaker, headphone jack, etc., allowing the user to also hear audio output from the hardware device. An additional but optional embodiment of the present disclosure may also include video or computer output jacks that will allow the user to hook the subject hardware device to an external television display device or a computer.

The hardware device 100 of the present disclosure will contain a user input module 124 to either receive user instructions via text input by the way of a standard keyboard interface, or a character recognition capture device which translates user text input into alphanumeric characters. Preferably, the character recognition device is a touch screen which overlays the display module 108 and text is entered via a pen-like stylus. Such input devices are standard and currently available on many electronic devices including portable digital assistants (PDAs) and cellular telephones. Alternatively, microphone 106 will be coupled to the input module 124 and the input module will further include a analog-to-digital (A/D) converter and a voice recognition processor that translates human voice into alpha numeric characters for user input.

The user will utilize the user input module after an image is captured to enter various data that will either be stored as a file associated with the digital image file or alternatively written as an additional part of the digital image file. By example, if the digital image is recorded by the hardware device as jpg101 or tif101 or bmp101 where these descriptions indicate the name of the captured digital image, then another file will be created for each captured digital image. This file would be the information associated file. In the above example, the image jpg101 would now have an additional file called info101 (or any other name that the hardware device selects). This digital file would receive and contain the user inputted information. Alternatively, the user input module may write its information directly to the previously stored digital file. By example, if the digital image is recorded by the hardware device as jpg101 or tif101 or bmp101 where these descriptions indicate the name of the captured digital image, then this file will be appended with the additional information written from the user input module, for example, in the header of the digital image file.

The device 100 will also include an auxiliary input computer module 126. This module will allow the hardware device to automatically and simultaneously (with image capture) store information in the associated file or alternatively in the same file as the digital image. The information from the auxiliary input module 126 will flow directly from the various input processors contained in the hardware device. These processors may include but are not limited to a processor to determine the individual number of the picture in the sequence of pictures shot that are captured and stored, a Global Positioning System (GPS) chip to determine the geographic location of where the image was taken, a date chip to determine the date and time the image was taken, a voice capture device to capture comments on the image, and various other input processors that will provide additional information relevant to the digital information, all information which the auxiliary input module will store as information in the info files or directly as addenda in the digital image files. Knowledge of the art, indicates that the individual processors such as GPS, date time and voice storage, may be separate processors or may also be incorporated as one computer processor.

After the digital image is captured and stored on the device 100, these files will be transferred to the user's local computer hardware device or to the Global Computer Network, e.g., the Internet, or to the user's local device and then to the Global Computer Network. This transfer will be done by transmission module 112 including hardwired and/or wireless connectivity. The hardwire connection may include but is not limited to hard wire cabling e.g., parallel or serial cables, USB cable, Firewire (1394 connectivity) cables and the appropriate port. The wireless connection will operate under any of the various known wireless protocols including but not limited to Bluetooth™ interconnectivity, infrared connectivity, radio transmission connectivity including computer digital signal broadcasting and reception commonly referred to as Wi-X or 80211.X (where x denotes the type of transmission), or any other type of communication protocols or systems currently existing or to be developed for wirelessly transmitting data. Furthermore, the transmission module 112 may include a removable memory card slot for accepting any of the various known removable memory cards, transferring the image files to the removable card, and subsequently the images may be uploaded to a computer from the removable memory card by an appropriate reader coupled to the user's computer. The file name of each digital image file and/or associated file will be recorded in a relational database either on the user's local computer or the Global computer network. This database will contain information on any file(s) related to each digital image including audio and video files, or other associated image files.

The user, or any other party, may print out any of the digital images described herein. The printing will be done once the images are stored on the local computer or the Global Computer Network and recorded in a relational database as described above. When the images are printed out, the computer that prints the image will cause the image to be printed with symbology that encodes that file name of the image and file location of the image, or any other coding that will provide access to the file name and file location. This file name will be the assigned name that the image was stored in at the relational database, as well as the assigned location of the relational database whether in the user's local computer or at a stored location on the Global Computer Network. The symbology may be in any form currently practiced in the art including barcodes (e.g., UPC, EAN, PDF417, etc.), photosymbols, standard or specialized text, etc, or any future type of symbology. Of course, as stated, any symbology utilized will represent or lead to the file names and file locations of the digital images.

The device 100 will further include an integrated scanning module 130 that will contain a light source, e.g., LED, and photocell coupled to the computer processing module 120, or alternatively, will includes a separate decoder engine that will decode the data received by the photocell before sending it to the computer processing module 120. Knowledge of the art reveals that many different types of scanners currently exist and the inventor realizes that the type of scanner would depend upon the type of symbology that is utilized in the printed images. The user will be able to scan the printed digital images with the device 100 and the scanning module 130 would scan in the symbology and using standard computer programming and the computer processing module, the device would translate the symbology to extract the name of the digital image and the file locations (whether local or on the Global Computer Network) of the digital image. Alternatively, the scanner may extract some type of marker or symbol that when presented to the relational database would indicate the file name and file location of the digital images. This information would then be transferred to the transmission module which will transmit it to the local or Global computer Network which will then submit it to the relational database containing information on the digital images. Using standard computer programming and processing, this database would then locate the stored digital image and associated files and also process the users request(s) regarding the digital image.

If the subject hardware device is coupled to a computer via the transmission module 112, then the hardware device 100 will receive back and display the processed requests on the display module 108. By example, a user may scan in a printed digital image with the hardware device 100 and then receive that image for display on his device, along with auxiliary information on the image, and along with auxiliary and associated audio and video files that can be displayed on the hardware device via the display module 108.

Figure 3A:
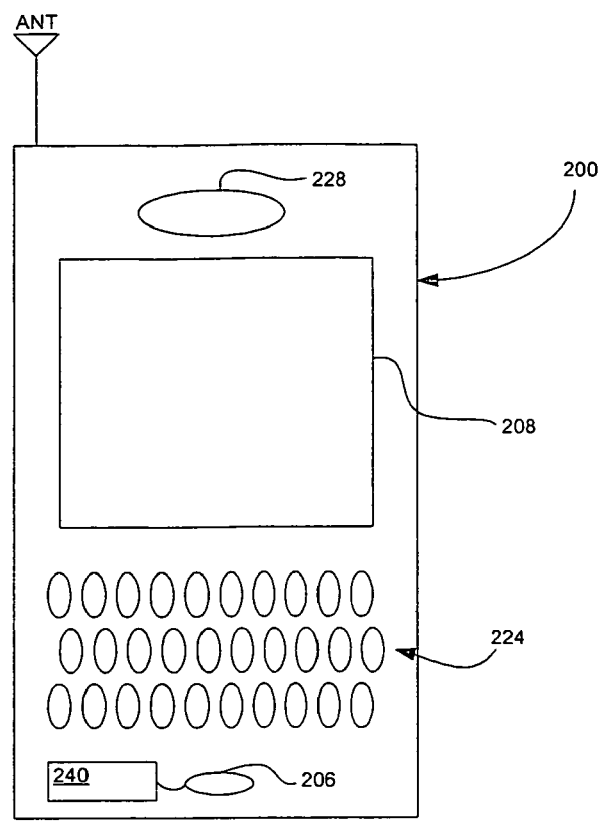
FIG. 3A is front view of a device for capturing digital images and embedding information in the captured images according to another embodiment of the present disclosure.
Figure 3B:
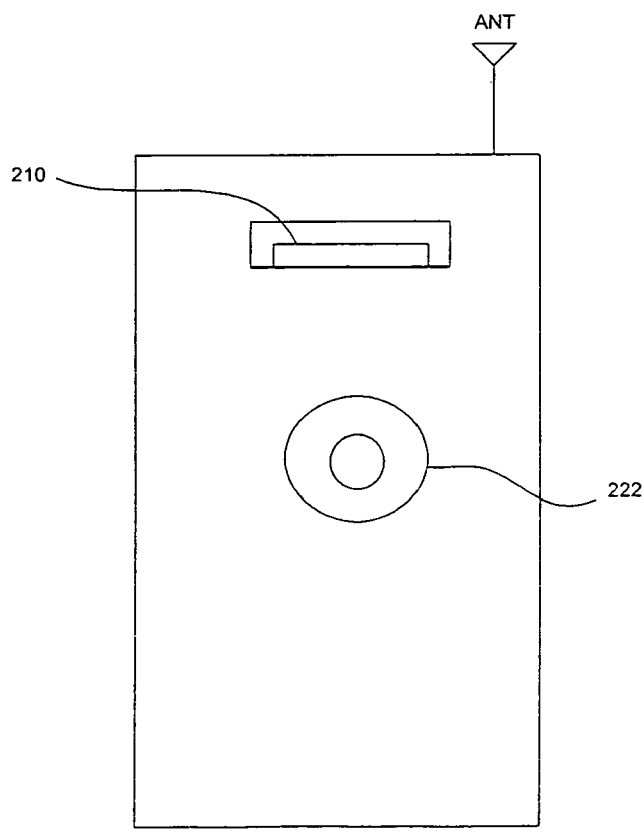
FIG. 3B is a rear view of the device illustrated in FIG. 3A.

Referring to FIGS. 3A and 3B, another embodiment of the present disclosure is illustrated. Here, a device 200 according to the principles of the present disclosure is embodied as a mobile phone. Device 200 includes a microphone 206 having the same functionality as microphone 106 and is further coupled to a communication module 240 for encoding a user's speech to be transmitted via antenna ANT using CDMA, PCS, GSM or any other known wireless communication technology. Device 200 further includes display module 208 for displaying captured images and preferably the display module will have a touch screen overlaid upon it which will enable user input via a stylus. The user may also enter phone numbers to be dialed via the touch screen. As is known in the mobile phone art, device 200 may include a full QWERTY keyboard 224 as an input module to enter text information to be associated to captured images. Earpiece or speaker 228 may be utilized to play audio clips associated with images in addition to being coupled to the antenna ANT and a decoder for receiving and decoding voice communication from another mobile phone.

Preferably, the antenna ANT is coupled to a transmission module similar to the one described above in relation to FIG. 2. The transmission module will compress and encode captured images for transmission using any known wireless communication technology. Transmitting images via wireless technology will facilitate the transferring of images to an online photo storage site or to an online photo developing service provider.

Referring to FIG. 3B, a rear side of device 200 is shown. Capture module 222 is employed for capturing images and when disposed on a rear side of device 200 is used in conjunction with display module 208 for positioning a subject of the image in lieu of a viewfinder. In this embodiment, the capture module 222 may also be used in conjunction with the scanning module to read symbology associated with an image. Here, the capture module will acquire an image of the symbology and the scanning module will further include a digital signal processor executing an algorithm for deciphering or decoding the symbology from the capture image. The use of an image sensor to read symbology, e.g., a barcode, is known in the art and systems employing such technology is commercially available from Symbol Technologies of New York.

Similar to the embodiments described in relation to FIGS. 1 and 2, device 200 includes a storage module 210 for storing images via a removable memory card.

Figure 4:
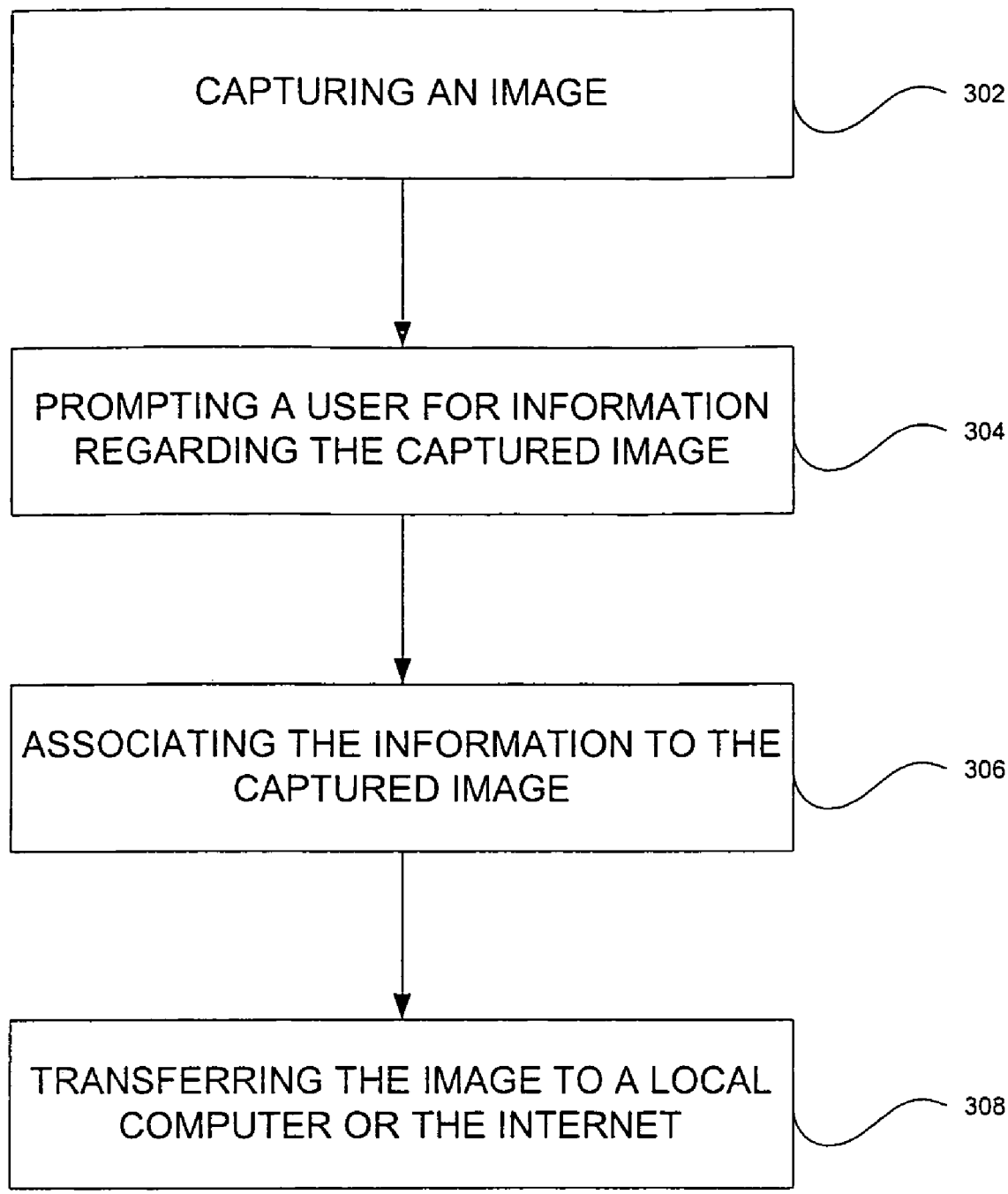
FIG. 4 is a flowchart illustrating a method for embedding information in a digital image according to an embodiment of the present disclosure.

In utilizing the hardware device described herein, the user will be able to accomplish the various applications of the disclosure which are described below in relation to FIG. 4.

A user takes several pictures with his imaging device (step 302). In one example, the picture is of a baby in Las Vegas. The next picture is of a Monet painting hanging in a gallery in Las Vegas. Another picture is of the user's wife. At end of taking pictures or alternatively, immediately after taking each individual picture, the user goes back to the device 100, 200 and using either keystroke input via input module 124 or voice recognition software via a microphone, or any other input means the user is prompted to provide the following information regarding the pictures, i.e., the images taken (step 304):

(1) The file location to store the photos or images once they are transferred to permanent memory storage, e.g., a local computer or a server residing on the Internet. For the first picture the user indicates that he would like the photo stored under his baby picture file, e.g., a folder on his local computer, for the second picture his famous art file, and for third picture his file with pictures of his wife.

(2) The user is then asked via the speaker, or prompted on the display module 108, 208, if he wants to attach any audio or video to the images to stay associated with the images once they are stored. He indicates that for the first image he wishes to record an audio file indicating: "this is a picture of my baby girl Samantha here in Las Vegas. Boy is she cute." For the second image: "Loved this Monet and had previously seen it in at the Louvre last year" for third: "Jenny is wearing the new dress that I just bought her" also for number three picture please attach the video file entitled Jenny's day in Las Vegas to this picture.

(3) The user now is asked via text input or voice recognition or any other input means, whether they will be storing these photos online. The answer would be either Yes or No. If the user answers Yes, a predetermined site could have been selected and pre-stored in the camera hardware device (for instance the Ofoto or Imagestation site) and selected photos would automatically go to that location for upload when the digital images are transferred.

The hardware device retrieves (from input that it receives from the auxiliary input computer module 126) the time and location of the images. The hardware device also knows (from memory that was pre-stored in the hardware) the name and identification information on the owner of the hardware device or any guest using the device. Moreover, the hardware device will also store the number of the digital image by recording the order that the image was taken in. The user can also flag (select) any images that he would like to have printed or emailed.

The various information is then complied and either stored as a separate information file associated to the image or appended to the digital image file and stored for example in the header of the image file (step 306).

The user will now transfer the images to his local computer workstation which may or may not be connected to the Global Computer Network via transmission module 112 (step 308). When the computer receives these imbedded 'smart pix' images, the computer will:

a. Sort and file the images in the file or folder selected including storing the files with the associated information and audio and video attachments;
b. Perform any actions requested for the photos including, email the photos to a selected user or users and print the photos on designated printers in a size pre-selected; and
c. With a connection to the Global Computer Network, automatically upload the photos and associated attached files to the specified server site (Ofoto, or Smartpix, for instance) for storage and retrieval.

Once the images are printed, the user will be enabled, regardless of the time elapsed since the images were taken, to take a hardware device (possibly the camera device that the user utilized to take the images, or another hardware reader device) and scan it over a photo. The device will read the symbology in the images and using standard communications techniques including Wifi or Bluetooth, Infrared, or Cabling, etc., the scanning/reading device will transmit the photo identifier information to a computer processor which then may optionally transfer it to the Global Computer Network. The device will then receive the information back from the local processor or Global Computer Network and will then locate the file or files that contain the image and associated attachments on the local or Global Computer Network.

By example, the user holds the scanning device over images of a child on the beach and an audio track then comes back: "Daddy I love this beach and I love you". The user would also be able to instantly receive information on the photo such as when and where the photo was taken and who the photographer was. The user could also request that the photo be printed to a local printer in a specific size or that the picture be emailed to a selected recipient. Other user requests could include asking the computer to display all associated photos, and file attachments, or to store the photo in a selected location on the local computer or the Global Computer Network.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A digital imaging device comprising:
   a first capture module for capturing an image and creating a digital image file, the digital image file comprising data representing the captured image;
   a display module disposed on the digital imaging device for displaying the captured image and configured to prompt a user to input information regarding the captured image;
   an input module disposed on the digital imaging device for enabling the user to input subject information related to a subject of each captured image and to input storage location information indicative of a storage location on a separate external computing device for storing each digital image file after transfer from the digital imaging device;
   a second capture module configured to scan coded information to be associated with the captured image;
   a processing module for associating the subject information, storage location information, and the coded information to the digital image file; and
   a transmission module for transmitting the digital image file and the associated information to the external computing device for storage or data lookup.

2. The device as in claim 1, wherein the display module is further adapted for displaying the associated information.

3. The device as in claim 1, wherein the coded information associated with the digital image file is printed with the captured image.

4. The device as in claim 1, wherein the coded information associated with the digital image file is displayed with the captured image.

5. The device as in claim 1, further comprising a microphone for acquiring audio to be associated to the digital image file.

6. The device as in claim 1, further comprising a storage module for storing at least one digital image file and the inputted information and coded information associated to the at least one digital image file.

7. The device as in claim 1, wherein the transmission module is a hardwired connection, a wireless connection or a removable memory card slot for receiving removable memory.

8. The device as in claim 1, further comprising an auxiliary input module for determining a geographic location of where the captured image was taken, wherein the processing module associates the determined geographic location to the captured image.

9. The device as in claim 1, wherein the second capture module is further adapted for scanning information to be associated with the digital image file.

10. The device as in claim 1, wherein the processing module is adapted to create a separate information file including the inputted information that is associated to the digital image file.

11. The device as in claim 1, wherein the processing module is adapted to append the inputted information to the digital image file.

12. The device as in claim 1, wherein the digital imaging device is a personal digital assistant (PDA).

13. The device as in claim 1, wherein the digital imaging device is a mobile phone further comprising:
    a communication module coupled to an antenna for wirelessly receiving and transmitting communication messages;
    wherein the transmission module is further coupled to the antenna for transmitting the digital image file and the associated information to the external computing device for storage or data lookup.

14. The device in claim 13, further comprising a microphone for acquiring audio to be associated to the digital image file.

15. The device as in claim 13, further comprising an audio output device for audibly prompting the user to input information regarding the captured image and for audibly producing the received communication messages.

16. The device as in claim 1, further comprising an auxiliary input module for generating auxiliary information related to the captured image, wherein the auxiliary information is date, time, sequence number of the capture image and user information.

17. The device as in claim 1, wherein the second capture module is further adapted for reading the coded information associated with the digital image file, the transmission module is further adapted to transmit the coded information to the external computing device and receive the digital image file and associated information retrieved at the external computing device based on the coded information, and the display module is further adapted for displaying the captured image associated with the retrieved digital image file.

18. The device as in claim 1, further comprising an auxiliary input module for generating auxiliary information related to the captured image, wherein the processing module associates the auxiliary information to the digital image file.

19. A method for associating information with a digital image, the method comprising the steps of:
    providing a digital imaging mobile device;
    capturing an image and creating a digital image file with the mobile device, the digital image file comprising data representing the captured image;
    prompting a user of the digital imaging mobile device for information regarding the captured image;
    receiving input information and storage location information from the user for each digital image file, the input information being indicative of a subject of the respective captured image and the storage location information being indicative of a storage location on a separate external computing device for storing each digital image file after transfer from the digital imaging mobile device;
    scanning coded information to be associated with the captured image;
    associating the input information, storage location information and coded information to the digital image file; and
    transmitting the digital image file and associated information to the external computing device for storage or data lookup.

20. A digital imaging device comprising:
    a capture module for capturing an image and creating a digital image file, the digital image file comprising data representing the captured image;
    an input module disposed on the digital imaging device for enabling a user to input subject information related to a subject of each captured image and to input storage location information indicative of a storage location on a separate external computing device for storing each digital image file after transfer from the digital imaging device and for receiving coded information to be associated with the captured image;

a processing module for associating the subject information, storage location information, and coded information to the digital image file; and a transmission module for transmitting the digital image file and the associated information to the external computing device for storage or data lookup.

21. The device as in claim 20, further comprising a display module disposed on the digital imaging device, wherein the transmission module is further adapted to retrieve the digital image file and associated information from the external computing device, and wherein the display module is adapted to display the captured image associated with the retrieved digital image file along with the input information and symbology information associated with the retrieved digital image file.

\* \* \* \* \*